Dec. 8, 1959 M. A. STOKES 2,916,367

COMBUSTION SYSTEMS FOR GAS TURBINE ENGINES

Filed Feb. 6, 1956

United States Patent Office 2,916,367
Patented Dec. 8, 1959

2,916,367

COMBUSTION SYSTEMS FOR GAS TURBINE ENGINES

Morris A. Stokes, Coventry, England, assignor to Armstrong Siddeley Motors Limited, Coventry, England Application February 6, 1956, Serial No. 563,805

Claims priority, application Great Britain February 25, 1955

6 Claims. (Cl. 48—107)

This relates to a fuel vapor generator, for a combustion system of a gas turbine engine of the kind having a combustion chamber supplied with air and fuel which are proportioned so as to ensure that there is no uncombined oxygen in the effluent therefrom, means being provided for introducing the rest of the fuel (hereinafter referred to as the main fuel) required, in the combustion system, into the effluent from the combustion chamber so that it will be completely vaporized, while distributing means are arranged to ensure that the completely vaporized fuel (admixed with the effluent) is uniformly distributed to the combustion system.

Such an arrangement is disclosed in British patent specification No. 712,843.

This prior arrangement depends for its operation on a supply of compressed air and if this is taken from the outlet of the compressor of the gas turbine engine it is satisfactory in some conditions, but it is not satisfactory for use in a combustion system having a very low pressure drop, such as is necessary for supersonic work.

The main object of the invention is to remedy this disadvantage.

According to the invention, the delivery of the main fuel into the effluent is arranged to take place through a valve means which will not pass any of the main fuel until the latter reaches a predetermined pressure such as will ensure a satisfactory ejector action whereby to promote the flow of effluent gases.

According to a further feature, the vaporized fuel and effluent are passed through a mixing chamber terminating in a diffuser whereby to raise the pressure head of the mixture at entrance to the main combustion chamber.

The valve may take the form of a spring-pressed valve member adapted to coact with an outlet for the main fuel to form a variable area nozzle outlet controlled by the pressure of the fuel whereby to maintain constant the velocity of the liquid fuel issuing from the nozzle outlet.

Figure 1:
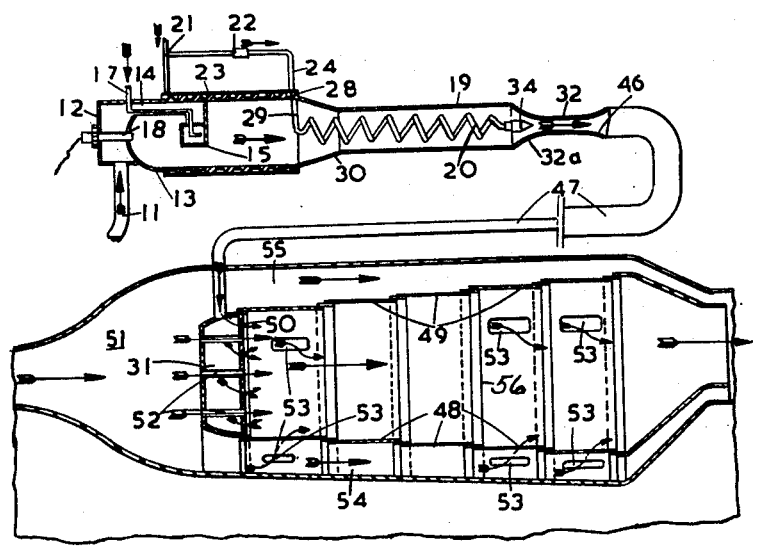
Figure 1 is a sectional view showing, at the top, one form of vapor generator according to the invention and, at the bottom and to a smaller scale, an annular combustion system to be fed with the output therefrom.

Referring to the drawings, air from the engine compressor is delivered through a pipe 11 into a chest 12 in the upstream end of the combustion chamber 13 of the vapor generator, whence it passes through a duct 14, generally of segmental cross-section, into a chamber 15 having a sharp-edged outlet orifice 16. Fuel is delivered through a pipe 17 which extends through the duct 14 and terminates in the chamber 15. This fuel is delivered, in jet form, towards a downstream end wall of the chamber and is subjected to turbulence with the air for mixing purposes, the mixture of fuel and air emerging, in the upstream direction, from the sharp-edged orifice (which enhances the mixing) to the vicinity of an igniter which is indicated generally at 18. The mixture is such that, after combustion, no uncombined oxygen is present, and the effluent, of hot combustion gases, passes into a tail pipe 19 to preheat the main fuel in a coil 20.

Figure 3:
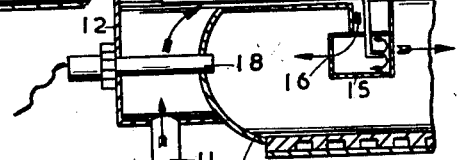
Figure 3 is a section to a smaller enlarged scale of the combustion system of the vapor generator.

The main fuel supply, which is under pressure, is through a pipe 21 and, in dependence on the condition of operation of a control 22, the whole of this fuel can be made to pass through a jacket 23 surrounding the chamber 13 on its way to the coil, or a part can pass through the jacket and the remainder directly to the coil through a pipe 24. As shown in Figure 3, this cooling jacket is formed by a tube 25 sealing a helix 26 on the outside of the chamber 13, the ends of the jacket being sealed by annular bands 27, 28. The pipe 21 delivers into the upstream end of the jacket, and a pipe 29 delivers from the downstream end of the jacket to the coil 20. This jacket serves to cool the chamber 13, and, of course, in doing so the fuel in the jacket becomes preheated. The pipe 24 delivers through the downstream end of the jacket into the pipe 29.

Figure 2:
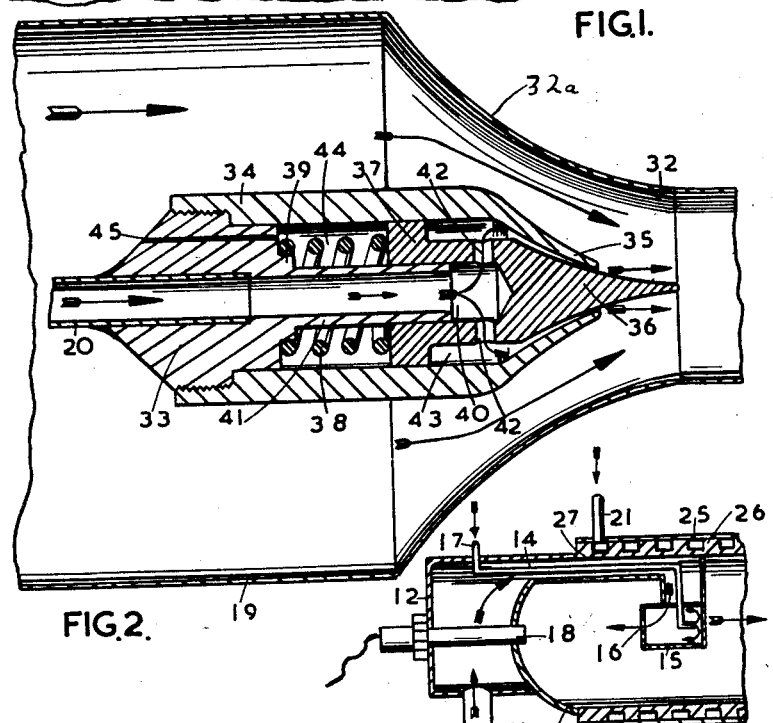
Figure 2 is a section to a greatly enlarged scale of a valve means of the vapor generator of Figure 1.

The passage of the effluent to heat the coil 20 is through a convergent portion 30 uniting the chamber 13 and the tail pipe 19, which is cylindrical, and in order for the preheated fuel issuing from the downstream end of the coil 20 to assert an ejector action on the effluent moving along the tail pipe 19, the downstream end of the coil is equipped with the valve means shown more particularly in Figure 2 by way of example.

This valve means, which is situated coaxially within a converging downstream end 32a of the tail pipe forming a venturi and leading to a mixing chamber 32, includes a tubular member 33 which is sealingly fast on the downstream end (which is straight) of the coil 20, and has an external screw-threaded connection with a sleeve 34 of which the downstream end is formed as a nozzle 35 having its exterior substantially conforming to, and annularly spaced from, the converging end 32a, Within the nozzle 35, and extending beyond its downstream end, is a correspondingly shaped nose 36 of a piston 37 which works in the bore of the sleeve and is acted upon by a compression spring 38, seating on a reduced portion 39 of the tubular member 33, normally to urge the nose 36 for closing the nozzle. It will thus be seen that the nose and nozzle constitute a needle valve.

The piston has a bore 40 by which it is slidably guided on an extension 41 of the tubular member, and this bore has lateral ports 42, 42 through which the preheated fuel, under pressure, can pass into an annular space 43 extending between the nozzle and the piston 37. These ports are of such size and number that no restriction occurs in the flow of the fuel from the coil to the space 43, and it is arranged for the port area to be larger than the maximum outlet area of the needle valve.

The outlet area of the needle valve is controlled by the pressure of the fuel fed to the annular space 43 in conjunction with the spring pressure. The arrangement is such that the nose 36 closes the nozzle outlet until such time that the fuel attains a predetermined high pressure, when the nozzle outlet will be opened a predetermined amount. At higher fuel pressures the nose 36 will be opened corresponding greater amounts to vary the area of the nozzle outlet for maintaining constant the velocity of the fuel issuing from the outlet.

The annular space 44 upstream of the piston is vented by a small bleed hole 45.

Maintaining the main fuel at and above the predetermined high pressure, in the manner described, also prevents it from being vaporized in the coil 20.

Thus, when the nozzle outlet is opened, the preheated main fuel emerges at high velocity from the nozzle and is immediately flash vaporized in the effluent flowing past the nozzle into the chamber 32, and the flow of the vaporized fuel and effluent has its velocity increased by the ejector action of the flash-vaporized fuel on the effluent. This increase of velocity acts to induce a supply of air to the vapor generator. The vaporized fuel and effluent are then thoroughly mixed in the mixing chamber 32, the downstream end of the latter diverging at 46 to form a diffuser, whereby to raise the pressure of the mixture, and being connected to a supply passage 47 leading to a chest 31 of the main combustion system which, in the example shown, includes inner and outer overlapping rings 48, 49, respectively, with intervening corrugated spacers 56 and defining an annular combustion space in which the vaporized fuel and effluent, which emerges from holes in the downstream wall 50 of the chest 31, is burnt with air, from the compressor, passing through the annulus 51 and through tubes 52 extending through the chest and the wall 50. Some of the rings 48, 49 are shown with inlets 53 for secondary or diluent air from inner and outer continuations 54 and 55, of the annulus 51.

By means of the invention, the required air supply to the vapor generator is ensured and, in the case where use is made of a diffuser, the pressure of the mixture of effluent and vaporized fuel is increased to enable a greater degree of turbulence to be achieved in the primary zone of the main combustion system. It will be seen, therefore, that the fuel operated ejector forms a pump which accelerates the flow of effluent through the system.

What I claim as my invention and desire to secure by Letters Patent of the United States is:

1. A fuel vapor generator comprising a combustion chamber, air and fuel inlets to said combustion chamber, a tail pipe from said combustion chamber and having a convergent downstream end forming a venturi, a main fuel nozzle positioned coaxially in said tail pipe and in the convergent portion of the venturi, through which nozzle main fuel to be vaporized is introduced under pressure, said nozzle having a radially outer surface which, in conjunction with said convergent portion of the venturi, is capable of producing ejector action for promoting flow of effluent gases through said tail pipe, a valve in said nozzle, biasing means to close said valve and means applying the pressure of said main fuel in opposition to said biasing means, whereby the valve remains closed until the main fuel pressure reaches a predetermined value.

2. A fuel vapor generator comprising a combustion chamber, air and fuel inlets to said combustion chamber, a tail pipe from said combustion chamber and having a convergent portion forming a venturi downstream of said combustion chamber, a main fuel nozzle positioned coaxially in said tail pipe and located in the convergent portion of the venturi, through which nozzle main fuel to be vaporized is introduced under pressure, said nozzle having a radially outer surface which, in conjunction with said convergent portion of said venturi is capable of producing ejector action for promoting flow of effluent gas through said tail pipe, a valve in said nozzle, biasing means to close said valve, means applying the pressure of said main fuel in opposition to said biasing means, whereby the valve remains closed until the main fuel pressure reaches a predetermined value, a mixing chamber in said tail pipe downstream of said venturi and a diffusing portion of said tail pipe downstream of said mixing chamber.

3. A fuel vapor generator comprising a combustion chamber, air and fuel inlets to said combustion chamber, a tail pipe from said combustion chamber and having a convergent downstream end forming a venturi, and a main fuel nozzle positioned coaxially in said tail pipe and in the convergent portion of the venturi, through which nozzle main fuel to be vaporized is introduced under pressure, said nozzle comprising a sleeve having externally thereof a surface which, in conjunction with said convergent portion of the venturi, is capable of producing ejector action for promoting flow of effluent gas through said tail pipe and having internally thereof a surface defining an outlet for main fuel from said nozzle, a movable member guided in said sleeve, means biasing said movable member to close said main fuel outlet and means applying the pressure of said main fuel in opposition to said biasing means, whereby said main fuel outlet remains closed until the main fuel pressure reaches a predetermined value.

4. A fuel vapor generator comprising a combustion chamber, air and fuel inlets to said combustion chamber, a tail pipe from said combustion chamber and having a convergent portion forming a venturi downstream of said combustion chamber, a main fuel nozzle positioned coaxially in said tail pipe and located in the convergent portion of the venturi, through which nozzle main fuel to be vaporized is introduced under pressure, a mixing chamber in said tail pipe downstream of said convergent portion of the venturi and a diffusing portion of said tail pipe downstream of said mixing chamber, said nozzle comprising a sleeve having externally thereof a surface capable in conjunction with said convergent portion of the venturi of producing ejector action for promoting flow of effluent gas through said tail pipe and having internally thereof a surface defining an outlet for main fuel from said nozzle, a movable member guided in said sleeve, means biasing said movable member to close said main fuel outlet and means applying the pressure of said main fuel in opposition to said biasing means, whereby said main fuel outlet remains closed until the main fuel pressure reaches a predetermined value.

5. A fuel vapor generator comprising a combustion chamber, air and fuel inlets to said combustion chamber, a tail pipe from said combustion chamber and having a convergent downstream end forming a venturi, a main fuel preheating pipe in said tail pipe, a main fuel nozzle positioned coaxially in said tail pipe and in the convergent portion of the venturi said nozzle communicating with the downstream end of said preheating pipe, said nozzle being connected for main fuel to be vaporized in the venturi to be introduced under pressure, said nozzle having a radially outer surface which, in conjunction with said convergent portion of the venturi is capable of producing ejector action for promoting flow of effluent gases through said tail pipe, a valve in said nozzle, biasing means to close said valve and means applying the pressure of said main fuel in opposition to said biasing means, whereby the valve remains closed until the main fuel pressure reaches a predetermined value.

6. A fuel vapor generator comprising a combustion chamber, air and fuel inlets to said combustion chamber, a tail pipe from said combustion chamber and having a convergent portion downstream of said combustion chamber forming a venturi, a main fuel preheating pipe in said tail pipe, said preheating pipe being adapted to receive main fuel under pressure, a main fuel nozzle positioned coaxially in said tail pipe and located in the convergent portion of the venturi communicating with the downstream end of said preheating pipe to receive main fuel under pressure to be vaporized in the venturi, a mixing chamber in said tail pipe downstream of said convergent portion of the venturi, and a diffusing portion of said tail pipe downstream of said mixing chamber, said nozzle comprising a sleeve having externally thereof a surface capable in conjunction with said convergent portion of the venturi of producing ejector action for promoting flow of effluent gas through said tail pipe and having internally thereof a surface defining an outlet for main fuel from said nozzle, a movable member guided in said sleeve, means biasing said movable member to close said main fuel outlet and means applying the pressure of said main fuel in opposition to said biasing means, whereby said main fuel outlet remains closed until the main fuel pressure reaches a predetermined value.

References Cited in the file of this patent

UNITED STATES PATENTS

| | | |
|---|---|---|
| 1,110,041 | Christian | Sept. 8, 1914 |
| 1,757,855 | Chilowsky | May 6, 1930 |
| 2,694,899 | Hague | Nov. 23, 1954 |
| 2,706,150 | Lloyd | Apr. 12, 1955 |

FOREIGN PATENTS

| | | |
|---|---|---|
| 712,843 | Great Britain | Aug. 4, 1954 |